(12) United States Patent
Shih et al.

(10) Patent No.: US 8,803,841 B2
(45) Date of Patent: Aug. 12, 2014

(54) TOUCH SPOT DETECTING METHOD OF TOUCH PANEL

(75) Inventors: Po-Sheng Shih, Zhunan (TW); Chien-Yung Cheng, Zhunan (TW)

(73) Assignee: Shih Hua Technology Ltd., Zhubei, Hsinchu County (TW)

( * ) Notice: Subject to any disclaimer, the term of this patent is extended or adjusted under 35 U.S.C. 154(b) by 346 days.

(21) Appl. No.: 13/337,067

(22) Filed: Dec. 24, 2011

(65) Prior Publication Data

US 2012/0274582 A1   Nov. 1, 2012

(30) Foreign Application Priority Data

Apr. 26, 2011   (TW) .................................. 100114538

(51) Int. Cl.
*G06F 3/045*   (2006.01)
(52) U.S. Cl.
USPC ........................................................ 345/174
(58) Field of Classification Search
None
See application file for complete search history.

(56) References Cited

U.S. PATENT DOCUMENTS

| | | | |
|---|---|---|---|
| 6,445,426 B1* | 9/2002 | Kang et al. | 349/12 |
| 2008/0296073 A1* | 12/2008 | McDermid | 178/18.05 |
| 2011/0007010 A1* | 1/2011 | Chen et al. | 345/173 |
| 2011/0134069 A1* | 6/2011 | Shen | 345/174 |
| 2011/0141051 A1* | 6/2011 | Ryu | 345/173 |
| 2012/0007813 A1* | 1/2012 | Chae et al. | 345/173 |

\* cited by examiner

*Primary Examiner* — Christopher R Lamb
(74) *Attorney, Agent, or Firm* — Novak Druce Connolly Bove + Quigg LLP

(57) ABSTRACT

A touch panel includes a conductive film having anisotropic impedance, a plurality of first electrodes, and a plurality of second electrodes. In a method for detecting a touch spot, a plurality of actual detecting signals are obtained by the first electrodes and the second electrodes, thereby determining two first electrodes and two second electrodes closest to the touch spot. The conductive film between the two first electrodes and two second electrodes is defined as a corrective area. An ideal resistance of the corrective area is set. An arbitrary electrode from the two first electrodes and two second electrodes is defined as electrode i. The actual detecting signal $S_i$ obtained by the electrode i is corrected according to a ratio of the ideal resistance to an actual resistance of the untouched corrective area.

14 Claims, 9 Drawing Sheets

TOUCH SPOT DETECTING METHOD OF TOUCH PANEL

BACKGROUND

1. Technical Field

The present application is related to detecting method, and particularly to a touch spot detecting method of a touch panel.

2. Description of Related Art

Touch sensing technology has found widespread applications in a variety of fields, such as mobile phones, personal digital assistants, automatic teller machines, game machines, medical devices, liquid crystal display devices, and computing devices. A user may input desired information and/or operate the electronic system through a touch sensing device associated with the electronic system.

Different types of touch panels include resistive touch panel, capacitive touch panel, surface acoustic wave touch panel, and infrared touch panel available for detection of a touch location.

A capacitive type touch panel includes a transparent conductive layer. The resistance distribution of the transparent conductive layer is non-uniform so the detecting precision is reduced.

BRIEF DESCRIPTION OF THE DRAWINGS

The components in the drawings are not necessarily drawn to scale, the emphasis instead being placed upon clearly illustrating the principles of at least one embodiment.

DETAILED DESCRIPTION

References will now be made to the drawings to describe, in detail, embodiments of the present method for detecting at least one touch spot.

Figure 1:
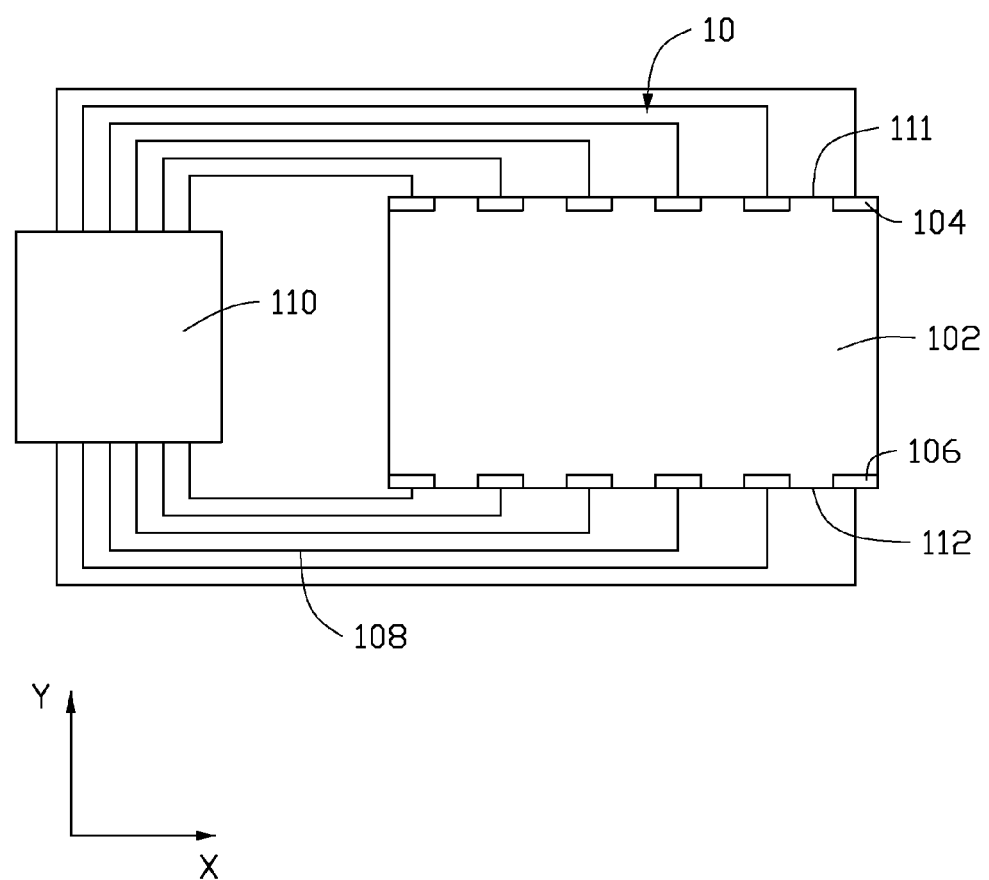
FIG. 1 is a schematic diagram showing a structure of one embodiment of a touch panel.

Referring to FIG. 1, a touch panel 10 includes a conductive film 102. In one embodiment, the touch panel 10 is a capacitance touch panel. The conductive film 102 has anisotropic impedance to define a low impedance direction (Y direction) and a high impedance direction (X direction), which are substantially perpendicular to each other. The conductive film 102 has a first side 111 and a second side 112, which are located at two opposite sides along the low impedance direction. A plurality of first electrodes 104 are disposed along the first side 111 and electrically connected to the conductive film 102. A plurality of second electrodes 106 are disposed along the second side 112 and electrically connected to the conductive film 102. Each of the first electrodes 104 and the second electrodes 106 is electrically connected to one or more driving detecting circuits 110 through a conductive line 108.

The driving detecting circuit 110 can be disposed on an integrated circuit board for providing a driving signal to the first electrodes 104 and the second electrodes 106 in sequence or simultaneously, and reading a detecting signal detected by each of the first electrodes 104 and each of the second electrodes 106 to determine whether the touch panel 10 is touched and the actual touch location. In one embodiment, the driving detecting circuit 110 comprises an integrated circuit (IC).

In the conductive film 102, the electrical conductivity along the low impedance direction is greater than the electric conductivity along the high impedance direction.

In one embodiment, the conductive film 102 consists of at least one carbon nanotube (CNT) film. The CNT film includes a plurality of carbon nanotubes and can be a freestanding structure. A large number of the carbon nanotubes of the CNT film can be oriented along a preferred orientation, meaning that a large number of the carbon nanotubes in the CNT film are arranged substantially along the same direction and substantially parallel to the surface of the CNT film. An end of one CNT is joined to another end of an adjacent CNT arranged substantially along the same direction by van der Waals force. A small number of the carbon nanotubes are randomly arranged in the CNT film, and have a small if not negligible effect on the larger number of the carbon nanotubes in the CNT film arranged substantially along the same direction.

Each of the first electrodes 104 is disposed corresponding to each of the second electrodes 106.I In other words, the first electrodes 104 and the second electrodes 106 parallelly extend to the low impedance direction of the conductive film 102. In one embodiment, each of the first electrodes 104 can be interlaced with each of the second electrodes 106. In other words, the extension direction of a line of each of the first electrodes 104 and any two second electrodes 106 is crossed with the low impedance direction of the conductive film 102.

Figure 2:
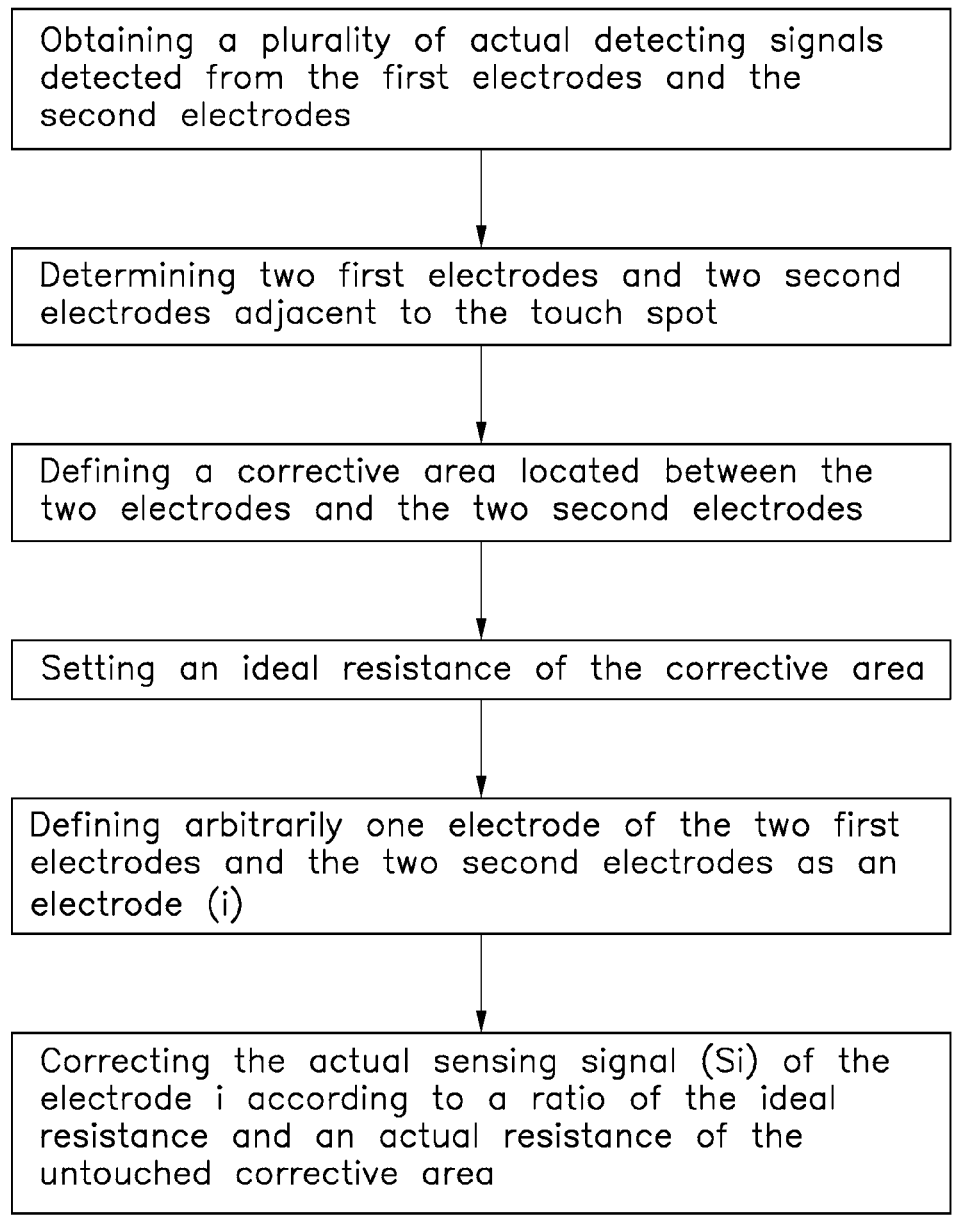
FIG. 2 is a flowchart of one embodiment of a touch spot detecting method of a touch panel.

Referring to FIG. 2, an embodiment of a touch spot detecting method of the touch panel 10 includes the following steps.

Step S1 is obtaining a plurality of actual detecting signals detected from the first electrodes 104 and the second electrodes 106. Step S2 is determining two first electrodes 104 and two second electrodes 106 that are the closest to the touch spot, according to the actual detecting signals. Step S3 is defining a corrective area between the two first electrodes 104 and the two second electrodes 106. Step S4 is setting an ideal resistance of the corrective area. Step S5 is defining an arbitrary electrode from the two first electrodes 104 and the two second electrodes 106. Step S6 is correcting an actual detecting signal $S_i$ of the electrode i according to a ratio of the ideal resistance to an actual resistance of the untouched corrective area.

Specifically, from step S1 to step S3, the driving detecting circuit 110 can provide a driving signal to the first electrodes 104 and the second electrodes 106 in sequence or simultaneously, and read an actual detecting signal detected by each of the first electrodes 104 and the second electrodes 106 in sequence or simultaneously while the touch panel 10 is being touched. The actual detecting signal may be a voltage, a current, or a capacitance. In the embodiment, the actual detecting signal is a voltage.

The current flowing in the conductive film 102 flows along the low impedance direction because the conductive film 102 has anisotropic impedance so that the actual detecting signal detected from the first electrodes 104 and the second electrodes 106 near the touch spot is stronger. Therefore, the two first electrodes 104 and the two second electrodes 106, which are the closest to the touch spot, can be determined according to the signal strength of the actual detecting signals detected from each electrode.

In step S4, setting the ideal resistance of the corrective area includes the following steps. Step S41 is providing a plurality of reference conductive films. The parameter of the reference conductive film is the same as the conductive film 102, wherein the parameter includes at least the material, thickness, or area. Step S42 is measuring a resistance in the corrective area along the low impedance direction of each reference conductive film. Step S43 is averaging the resistances of each of the reference conductive films to obtain the ideal resistance.

In other embodiment, after step S41, the ideal resistance can be obtained by measuring a first average resistance in the corrective area along the low impedance direction and a second average resistance in the corrective area along the high impedance direction, then averaging the first average resistance and the second average resistance. It should be noted, the ideal resistance of each corrective area may be measured by the method described above, and be stored in a memory of the integrated circuit board.

The signal strength of the detecting signal detected from one of the two first electrodes 104 and the two second electrodes 106 may be affected by the resistance of the conductive film 102 around the first electrode 104 or the second electrode 106 due to the non-uniform resistance distribution in the conductive film 102.

To reduce the error between the coordinate of the actual touch spot and the coordinate of a counted touch spot, the detecting signal detected from the two first electrodes 104 and the two second electrodes 106 must be corrected.

Before correcting the detecting signal, the two first electrodes 104 and the two second electrodes 106 can be defined as the electrode i, an electrode iX, an electrode iY and an electrode iXY. The electrode iXY is adjacent to the electrode i along the X direction, the electrode iY is adjacent to the electrode i along the Y direction, and the electrode iXY is adjacent to the electrode iY along the X direction.

The actual resistance of the untouched corrective area includes an actual resistance between the electrode i and the electrode iY along the Y direction, an actual resistance between the electrode iY and the electrode iXY along the X direction, an actual resistance between the electrode iXY and the electrode iX along the Y direction, an actual resistance between the electrode iX and the electrode i along the X direction, and the actual resistance of the corrective area between the electrodes i, iX, iY, and iXY. In one embodiment, the actual resistance of the untouched corrective area can be measured by providing a predetermined voltage V to the two electrodes, and measuring a current of the conductive film 102 between the two electrodes to obtain the actual resistance of the untouched corrective area.

The detecting signal $S_i$ can be corrected at the X direction according to $$S'_{ix} = S_i \times \frac{R_x}{R_{ideal}},$$

wherein $R_x$ is the actual resistance of the conductive film 102 between the electrode i and the electrode iX when untouched; $S_{ix}'$ is a corrected detecting signal of the electrode i at X direction; $R_{ideal}$ is the ideal resistance. The corrected detecting signal $S_{ix}'$ is for counting the Y-axis coordinate of the touch spot.

In addition, the detecting signal $S_i$ can be corrected at the Y direction according to $$S'_{iY} = S_i \times \frac{R_Y}{R_{ideal}},$$

wherein $R_Y$ is the actual resistance of the conductive film 102 between the electrode i and the electrode iY when the touch panel 10 is untouched; $S_{iY}'$ is a corrected detecting signal of the electrode i at Y direction. The corrected detecting signal $S_{iY}'$ is for counting the X-axis coordinate of the touch spot.

The sum of the actual detecting signals of the two first electrodes 104 and the two second electrodes 106 can be obtained by $$S'_m = S_m \times \frac{R_m}{R_{ideal}},$$

wherein $R_m$ is an actual resistance of the conductive film 102 between the four electrodes i, iX, iY, and iXY; $S_m$ is sum of the actual detecting signals of the electrodes i, iX, iY, and iXY.

The Y-axis of the touch spot can be obtained by formula (1):

$$Y = \frac{P_Y}{2} + \frac{(A-B)}{(A+B)} \times \frac{P_Y}{2} \quad (1)$$

wherein $P_Y$ is a resolution of the Y direction of the touch panel 10; A is the sum of the corrected detecting signal at the X direction of the two first electrodes 104; B is the sum of the corrected detecting signal at the X direction of the two second electrodes 106. In one embodiment, the value of the resolution can be set by the driving detecting circuit 110, for example, the value is in the range of 480 to 1024.

The X-axis of the touch spot can be obtained by formula (2):

$$X = \frac{P_X}{2(n-1)} + \frac{(C-D)}{(C+D)} \times \frac{P_X}{2(n-1)} + (N-1) \times \frac{P_X}{(n-1)} \quad (2)$$

wherein $P_X$ is a resolution of the X direction of the touch panel 10; n is the number of the first electrode 104 or the second electrode 106; N is a serial number of the first electrode 104 (or the second electrode 106), which is closest to the touch spot; C is the sum of the corrected detecting signal of a pair of the first electrode 104 and the second electrode 106; D is the sum of the corrected detecting signal of another pair of the first electrode 104 and the second electrode 106. In one embodiment, the value of the resolution can be set by the driving detecting circuit 110, for example, the value is in the range of 480 to 1024.

One embodiment of a touch spot detecting method is described hereinafter.

Figure 3:
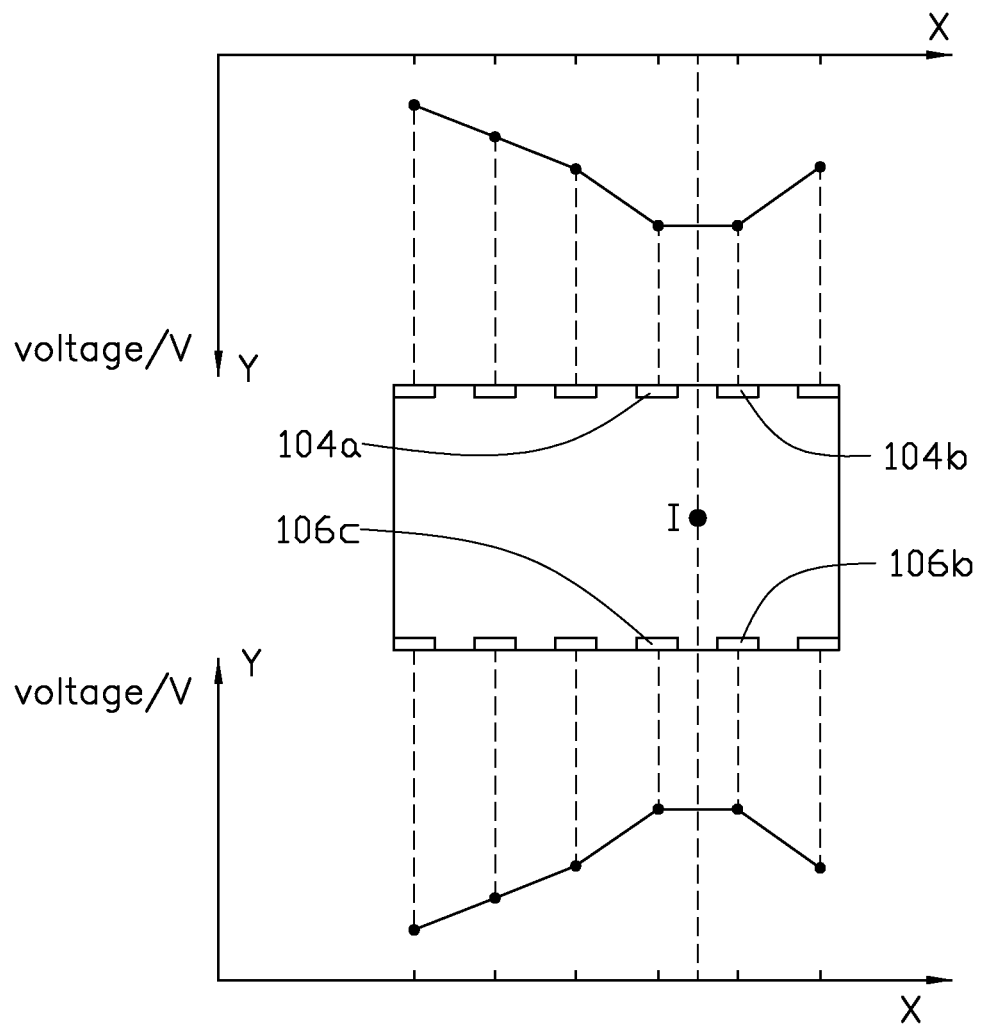
FIG. 3 is a simulated curve diagram showing the strength of the signal of the electrodes when a touch spot is detected according to one embodiment of the disclosure.

Referring to FIG. 3, the detecting signal detected from the first electrodes 104 and the second electrodes 106 can be simulated into two curve diagrams according to a touch spot I. In the diagram, the actual detecting signals detected from the two first electrodes 104a and 104b, which are adjacent to the touch spot I, is equal and greater than the actual detecting signal detected from the other first electrodes 104. The actual detecting signals detected from the two second electrodes 106c and 106d, which are adjacent to the touch spot I, is equal and greater than the actual detecting signal detected from the other second electrodes 106. Therefore, the area covered by the first electrodes 104a, 104b, and the second electrodes 106c, 106d can be determined, and the touch spot I is located in the area.

Figure 4:
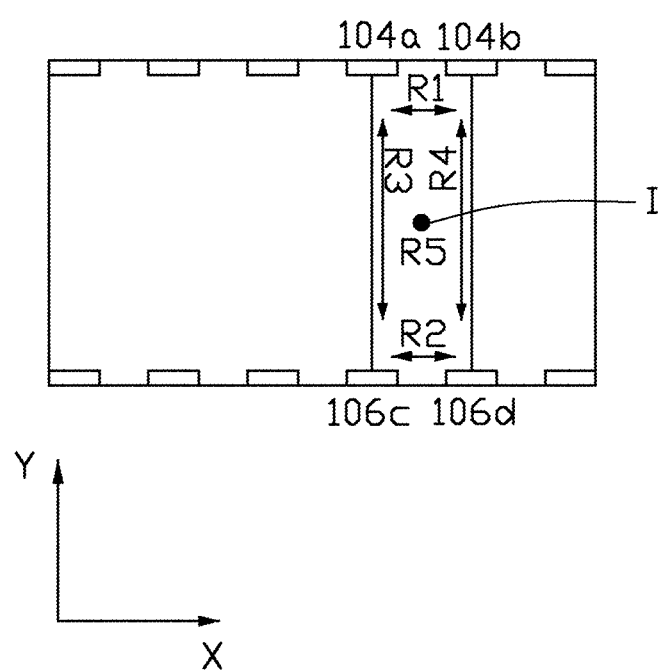
FIG. 4 is a schematic diagram showing a resistance distribution of the conductive film in the corrective area when the touch spot is detected according to one embodiment of the disclosure.

Referring to FIG. 4, in the area, the actual resistance of the conductive film 102 between the first electrodes 104a and 104b along the X direction is defined as resistance $R_1$, the actual resistance of the conductive film 102 between the first electrode 104a and the second electrode 106c along the Y direction is defined as resistance $R_3$, the actual resistance of the conductive film 102 between the first electrode 104b and the second electrode 106d along the Y direction is defined as resistance $R_4$, the actual resistance of the conductive film 102 between the second electrodes 106c and 106d along the X direction is defined as resistance $R_2$, and the actual resistance of the conductive film 102 between the electrodes 104a, 104b, 106c, and 106d is defined as resistance $R_5$.

Figure 5:
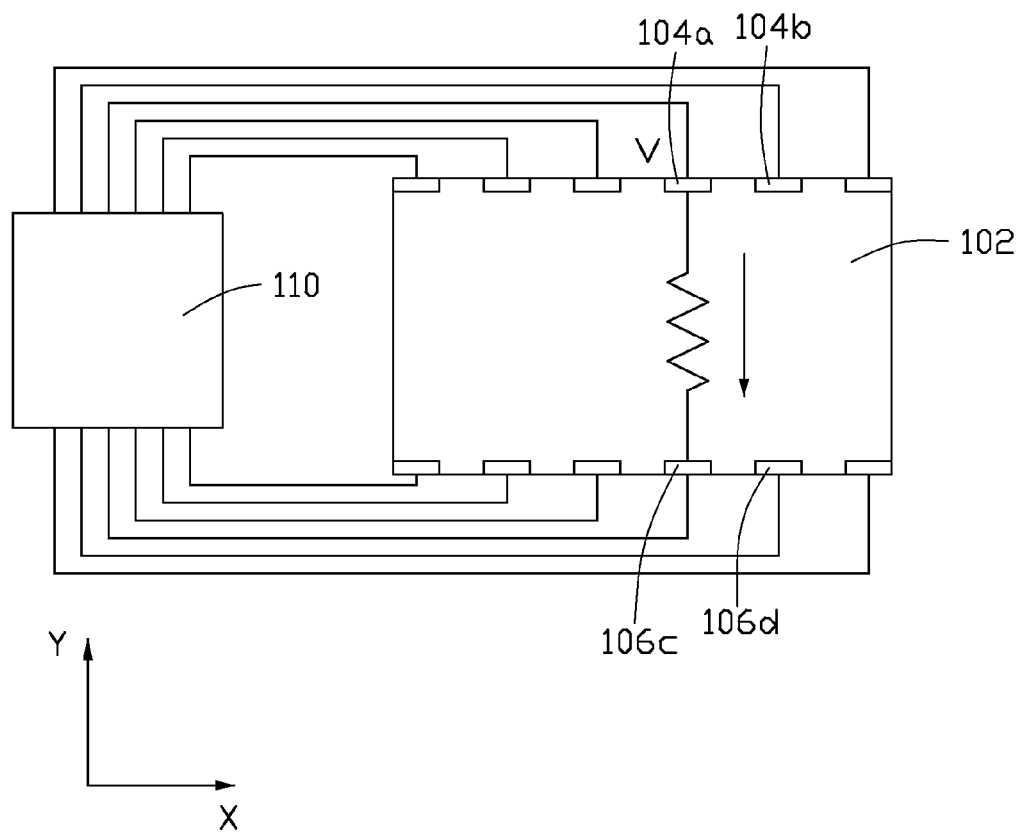
FIGS. 5 and 6 are detecting diagrams of the actual resistance of a pair of the first electrode and the second electrode along the low impedance direction when untouched according to one embodiment of the disclosure.

Referring to FIG. 5, the resistance $R_3$ is obtained by the steps of providing the predetermined voltage V between the first electrode 104a and the second electrode 106c to generate a current flowing along the low impedance direction from the first electrode 104a to the second electrode 106c, and detecting the current value of the conductive film 102 by the driving detecting circuit 110 to count the resistance $R_3$.

Figure 6:
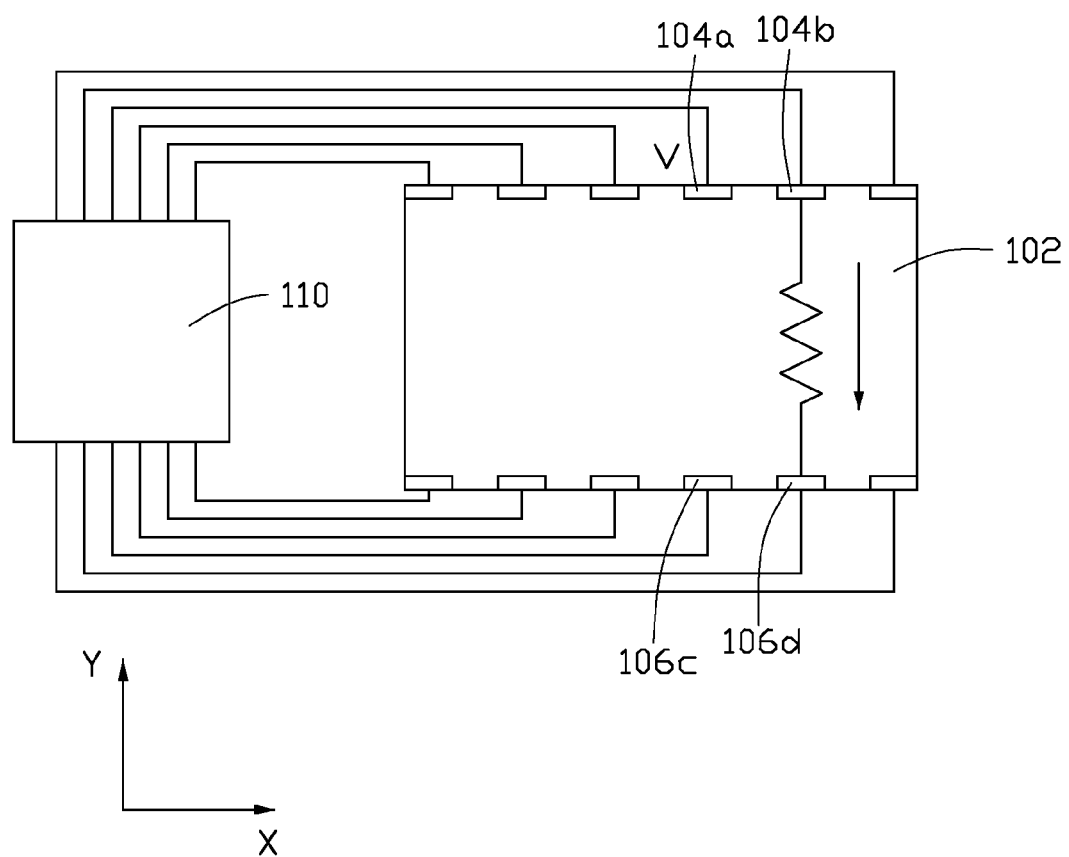

Referring to FIG. 6, the resistance $R_4$ is obtained by the steps of providing the predetermined voltage V between the first electrode 104b and the second electrode 106d to generate a current flowing along the low impedance direction from the first electrode 104b to the second electrode 106d, and detecting the current value of the conductive film 102 by the driving detecting circuit 110 to count the resistance $R_4$.

Figure 7:
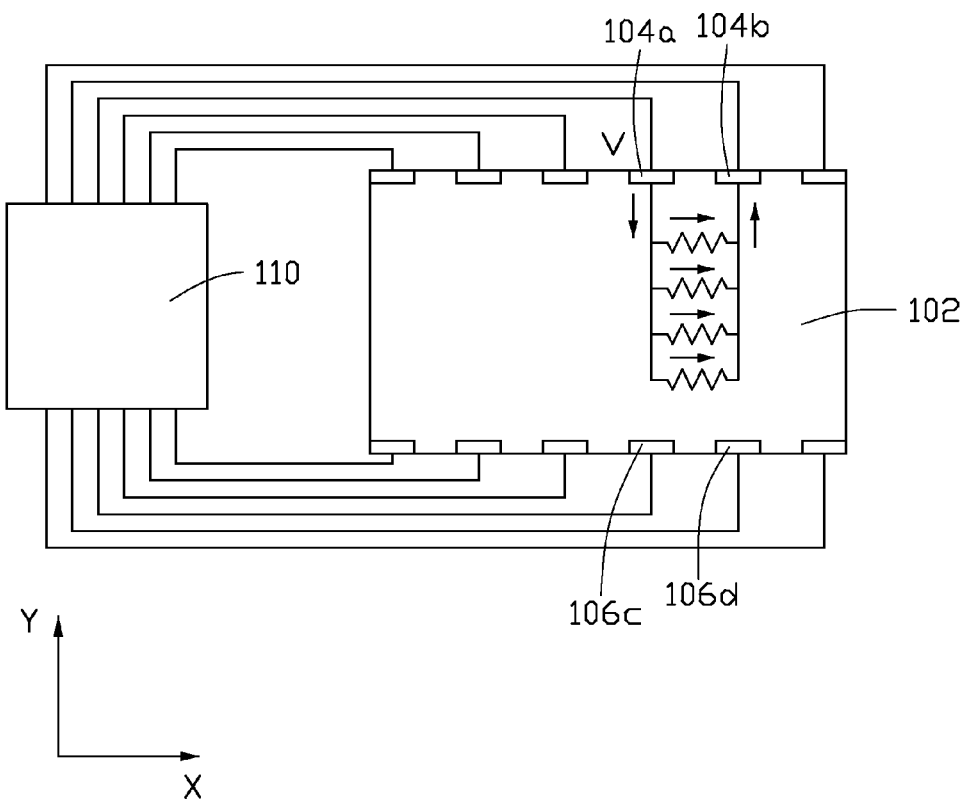
FIGS. 7 and 8 are detecting diagrams of the actual resistance of two adjacent first electrode and second electrode along the high impedance direction when untouched according to one embodiment of the disclosure.

Referring to FIG. 7, the resistance $R_1$ is obtained by the steps of providing the predetermined voltage V between the first electrode 104a and the first electrode 104b to generate a current flowing along the low impedance direction from the first electrode 104a to the first electrode 104b, and detecting the current value of the conductive film 102 by the driving detecting circuit 110 to count the resistance $R_1$.

Figure 8:
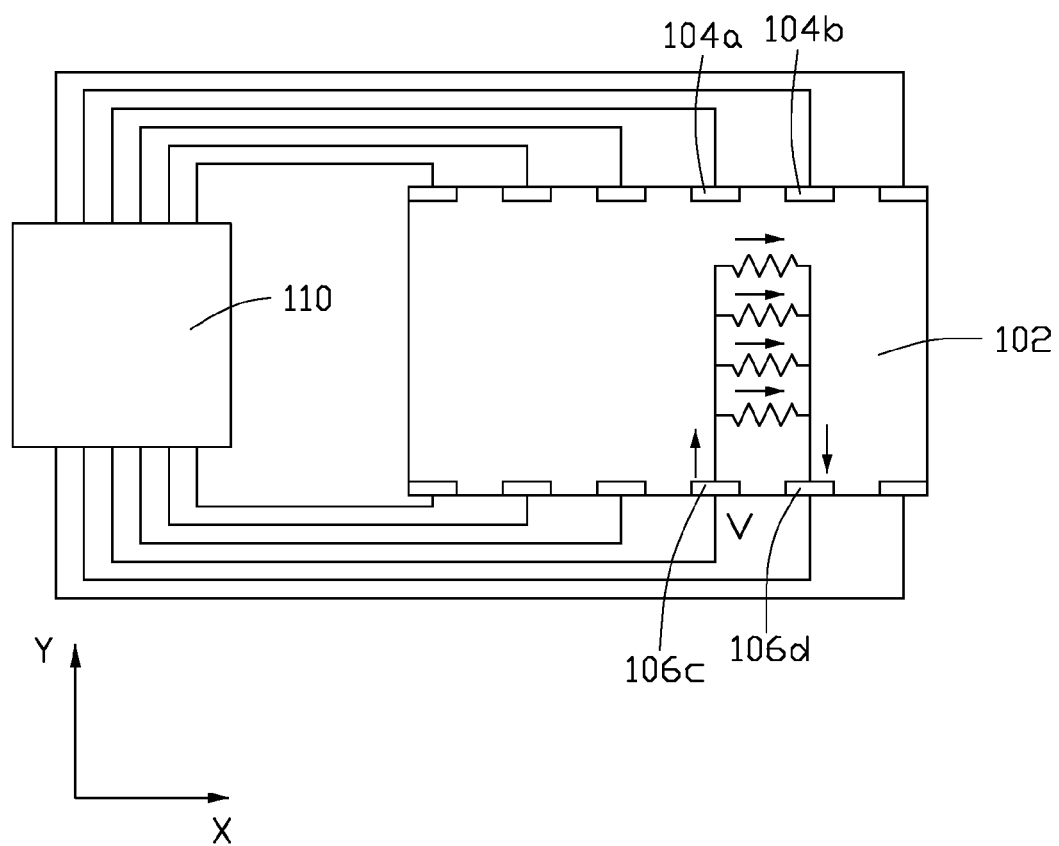

Referring to FIG. 8, the resistance $R_2$ is obtained by the steps of providing the predetermined voltage V between the second electrode 106c and the second electrode 106d to generate a current flowing along the low impedance direction from the second electrode 106c to the second electrode 106d, and detecting the current value of the conductive film 102 by the driving detecting circuit 110 to count the resistance $R_2$.

Figure 9:
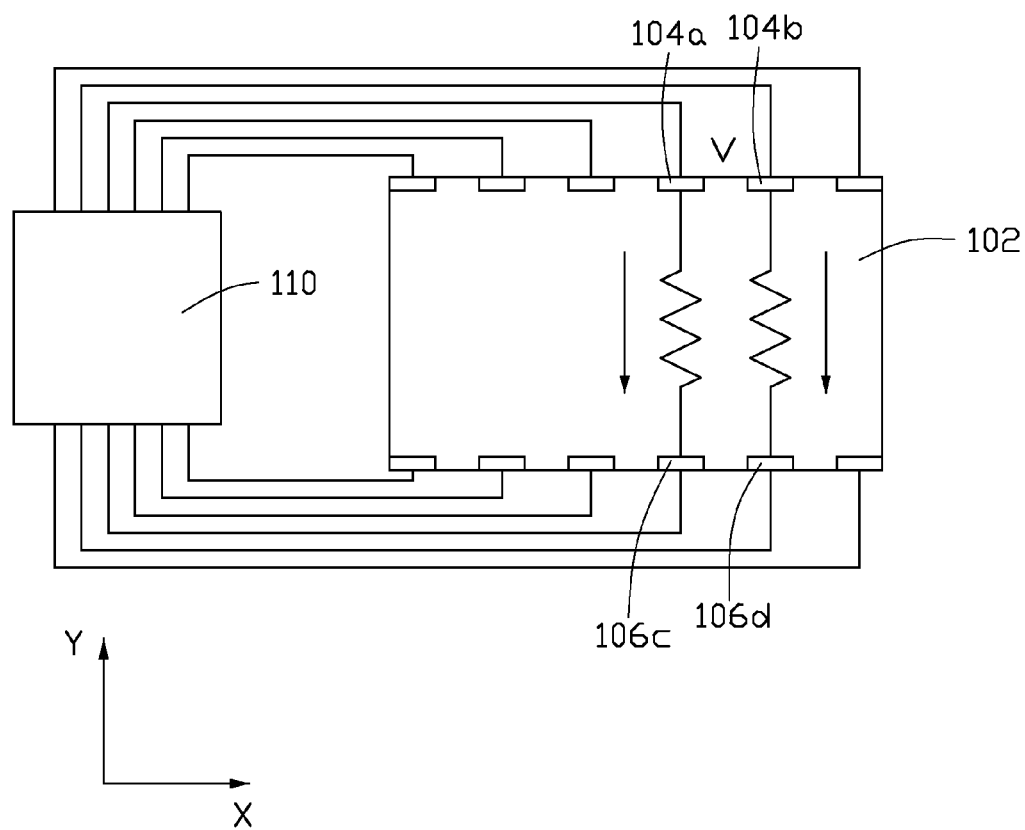
FIG. 9 is a detecting diagram of the actual resistance of the conductive film between the two first electrodes and the two second electrodes adjacent to the touch spot according to one embodiment of the disclosure.

Referring to FIG. 9, the resistance $R_5$ is obtained by the steps of providing the predetermined voltage V between the first electrode 104a and the second electrode 106c, and providing the predetermined voltage V between the first electrode 104b and the second electrode 106d simultaneously so as to generate a current flowing from the first electrode 104a to the second electrode 106c, and a current flowing from the first electrode 104b to the second electrode 106d. The current $I_1$, which flows from the first electrode 104a to the second electrode 106c, and the current $I_2$, which flows from the first electrode 104b to the second electrode 106d, are then detected by the driving detecting circuit 110. The resistance $R_5$ can be obtained by the formula $R_5 = V/(I_1+I_2)$ to be the actual resistance of the area covered by the electrodes 104a, 104b, 106c, and 106d.

Before determining the coordinate of the touch spot I, the detecting signals detected from the electrodes 104a, 104b, 106c, and 106d should be corrected. To correct the detecting signal $S_a$ detected from the first electrode 104a as an example, the detecting signal $S_a$ can be corrected by $$S'_{aY} = S_i \times \frac{R_Y}{R_{ideal}} = S_a \times \frac{R_3}{R_{ideal}}$$

for counting the X-axis coordinate, or the detecting signal $S_a$ can be corrected by $$S'_{aX} = S_i \times \frac{R_X}{R_{ideal}} = S_a \times \frac{R_1}{R_{ideal}}$$

for determining the Y-axis coordinate. Similarly, the detecting signal $S_b$, $S_c$, and $S_d$ detected from the electrodes 104b, 106c, and 106d also can be corrected by the similar method described above.

In addition, the sum $S_m$ of the detecting signals $S_a$, $S_b$, $S_c$, and $S_d$ can be corrected by $$S'_m = S_m \times \frac{R_m}{R_{ideal}} = (S_a + S_b + S_c + S_d) \times \frac{R_5}{R_{ideal}}.$$

In the embodiment, the Y-axis coordinate can be obtained by $$Y = \frac{1023}{2} + \frac{((S'_{aX} + S'_{bX}) - (S'_{cX} + S'_{dX}))}{(S'_{aX} + S'_{bX} + S'_{cX} + S'_{dX})} \times \frac{1023}{2},$$

wherein $P_Y$ is 1023, $S_{bX}'$ is the corrected detecting signal of the first electrode 104b along the X direction, $S_{cX}'$ is the corrected detecting signal of the second electrode 106c along the X direction, and $S_{dX}'$ is the corrected detecting signal of the second electrode 106d along the X direction. In addition, the X-axis coordinate can be obtained by $$X = \frac{1023}{2 \times 5} + \frac{((S'_{aY} + S'_{cY}) - (S'_{bY} + S'_{dY}))}{(S'_{aY} + S'_{bY} + S'_{cY} + S'_{dY})} \times \frac{1023}{2 \times 5} + \frac{2 \times 1023}{5},$$

wherein $S_{cY}'$ is the corrected detecting signal of the second electrode 106c along the Y direction, $S_{bY}'$ is the corrected detecting signal of the first electrode 104b along the Y direction, and $S_{dY}'$ is the corrected detecting signal of the second electrode 106d along the Y direction. Thus, the coordinate of the touch spot I is more accurate due to the detecting signal corrections.

It is to be understood, however, that even though numerous characteristics and advantages of certain inventive embodiments have been set out in the foregoing description, together with details of the structures and functions of the embodiments, the disclosure is illustrative only; and that changes may be made in detail to the full extent indicated by the broad general meaning of the terms in which the appended claims are expressed.

What is claimed is:

1. A detecting method for detecting at least one touch spot of a touch panel, wherein the touch panel includes a conductive film, a plurality of first electrodes and a plurality of second electrodes, the conductive film having anisotropic impedance so as to define a high impedance direction (X direction) and a low impedance direction (Y direction), and the conductive film having a first side and a second side which are located at two opposite sides of the low impedance direction, the first electrodes and the second electrodes are located along the first side and the second side, respectively, and electrically connected to the conductive film, the detecting method comprising the steps of:
- obtaining a plurality of actual detecting signals detected from the first electrodes and the second electrodes;
- determining two of the first electrodes and two of the second electrodes closest to the touch spot;
- defining a corrective area located between the two first electrodes and the two second electrodes;
- setting an ideal resistance of the corrective area ($R_{ideal}$);
- defining arbitrarily one electrode of the two first electrodes and the two second electrodes as an electrode (i); and
- correcting the actual sensing signal ($S_i$) of the electrode (i) in accordance with a ratio of the ideal resistance and an actual resistance of the untouched corrective area.

2. The detecting method of claim 1, wherein defining one of the two first electrodes and the two second electrodes, which is closest to the electrode (i) at the X direction as an electrode (iX), the actual detecting signal ($S_i$) is corrected by $$S'_{ix} = S_i \times \frac{R_x}{R_{ideal}},$$

wherein Rx is the actual resistance of the conductive film 102 between the electrode (i) and the electrode (iX) when untouched, and $S_{ix}'$ is a detecting signal of the electrode (i) after corrected at the X direction.

3. The detecting method of claim 2, wherein the corrected detecting signal ($S_{ix}'$) is for counting the Y-axis coordinate of the touch spot.

4. The detecting method of claim 3, wherein the Y-axis coordinate of the touch spot is obtained by $$Y = \frac{P_Y}{2} + \frac{(A-B)}{(A+B)} \times \frac{P_Y}{2},$$

wherein A is a sum of the corrected detecting signal at the X direction of the two first electrodes, B is a sum of the corrected detecting signal at the X direction of the two second electrodes, and $P_Y$ is a resolution of the Y direction of the touch panel.

5. The detecting method of claim 1, wherein defining one of the two first electrodes and the two second electrodes, which is closest to the electrode (i) at the Y direction as an electrode (iY), the actual detecting signal ($S_i$) is corrected by $$S'_{iY} = S_i \times \frac{R_Y}{R_{ideal}},$$

wherein $R_Y$ is the actual resistance of the conductive film 102 between the electrode (i) and the electrode (iY) when untouched, and $S_{iY}'$ is a detecting signal of the electrode (i) after corrected at the Y direction.

6. The detecting method of claim 5, wherein the corrected detecting signal ($S_{iY}'$) is for counting the X-axis coordinate of the touch spot.

7. The detecting method of claim 6, wherein the X-axis coordinate of the touch spot is obtained by $$X = \frac{P_X}{2(n-1)} + \frac{(C-D)}{(C+D)} \times \frac{P_X}{2(n-1)} + (N-1) \times \frac{P_X}{(n-1)},$$

wherein C is the sum of the corrected detecting signal of a pair of the first electrode and the second electrode, D is the sum of the corrected detecting signal of another pair of the first electrode and the second electrode, $P_X$ is a resolution of the X direction of the touch panel, n is the number of the first electrode or the second electrode, and N is a serial number of the first electrode or the second electrode.

8. The detecting method of claim 1, wherein a sum of the detecting signals of the two first electrodes and the two second electrodes is counted by $$S'_m = S_m \times \frac{R_m}{R_{ideal}},$$

wherein $R_m$ is an actual resistance of the conductive film between the two first electrodes and the two second electrodes, $S_m$ is the sum of the actual detecting signals detected from the two first electrodes and the two second electrodes, and $S_m'$ is the sum of the actual detecting signals of the two first electrodes and the two second electrodes, which have been corrected.

9. The detecting method of claim 8, wherein the corrected detecting signal $S_m'$ is for counting an X-axis coordinate and a Y-axis coordinate of the touch spot.

10. The detecting method of claim 8, wherein the ideal resistance is obtained by the following steps:
- providing a plurality of reference conductive films;
- measuring a resistance in the corrective area along the low impedance direction of each of the reference conductive films; and
- averaging the resistances of each of the reference conductive films.

11. The detecting method of claim 10, wherein a parameter of the reference conductive film is the same as to the conductive film and the parameter at least includes material, thickness or area.

12. The detecting method of claim 1, wherein the actual detecting signal is a voltage.

13. The detecting method of claim 1, wherein the two first electrodes and the two second electrodes with the strongest detecting signal are near the touch spot.

14. A detecting method for detecting at least one touch spot of a touch panel, wherein the touch panel includes a conductive film with anisotropic impedance and a plurality of first electrodes and second electrodes which are disposed at two opposite sides of the conductive film, and a low impedance direction is the direction extending from the side with the first electrodes to the side with the second electrodes, the detecting method comprising the steps of:
- obtaining a plurality of actual detecting signals detected from the first electrodes and the second electrodes;
- defining a corrective area located between the first electrodes and the second electrodes;
- setting an ideal resistance;
- defining arbitrarily one electrode of the first electrodes and the second electrodes as an electrode (i); and correcting the actual sensing signal ($S_i$) of the electrode (i) according to a ratio of the ideal resistance and an actual resistance of the untouched corrective area.

* * * * *